United States Patent
Koch

(10) Patent No.: US 12,520,760 B2
(45) Date of Patent: Jan. 13, 2026

(54) SYSTEM FOR CONTROLLING OPERATING CLEARANCE BETWEEN A CONCAVE ASSEMBLY AND A CROP PROCESSING ROTOR

(71) Applicant: AGCO Corporation, Duluth, GA (US)

(72) Inventor: Jared J. Koch, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 1012 days.

(21) Appl. No.: 17/645,957

(22) Filed: Dec. 23, 2021

(65) Prior Publication Data
US 2022/0201934 A1    Jun. 30, 2022

Related U.S. Application Data

(60) Provisional application No. 63/131,496, filed on Dec. 29, 2020.

(51) Int. Cl.
*A01D 41/14* (2006.01)
*A01D 41/127* (2006.01)

(52) U.S. Cl.
CPC ......... *A01D 41/141* (2013.01); *A01D 41/127* (2013.01)

(58) Field of Classification Search
CPC . A01D 41/141; A01D 41/127; A01D 41/1277
See application file for complete search history.

(56) References Cited

U.S. PATENT DOCUMENTS

| | | | |
|---|---|---|---|
| 6,119,442 A | 9/2000 | Hale | |
| 2009/0046890 A1* | 2/2009 | Hausmann | G06T 7/0012 800/275 |
| 2010/0010713 A1* | 1/2010 | Sheidler | A01D 41/127 701/50 |
| 2016/0029561 A1 | 2/2016 | Fischer et al. | |
| 2017/0024876 A1* | 1/2017 | Young | G06Q 50/02 |
| 2017/0118914 A1 | 5/2017 | Bedoya et al. | |
| 2018/0000011 A1 | 1/2018 | Schleusner et al. | |

(Continued)

OTHER PUBLICATIONS

UK Intellectual Property Office, Search report for related UK Application No. GB2100407.2, dated Jul. 9, 2021.

*Primary Examiner* — Robert E Fennema
*Assistant Examiner* — Magdalena I Kossek

(57) ABSTRACT

Technologies for controlling operating clearance between a concave assembly and a crop processing rotor of a combine harvester can be automated. The technologies can include a device configured to estimate respective dimensions of kernels of a crop harvested by a combine harvester as well as determine boundary conditions for the operating clearance based on the estimated respective dimensions of the kernels. Also, the boundary conditions are related to respective central core sizes (such as respective cob sizes) which can be determined based on the estimated respective dimensions of the kernels. The determination can include deriving the boundary conditions from a table including correlations between kernel dimensions and central core sizes, and the table can be enhanced by a feedback loop. The operating clearance can be automatically adjusted according to the determined boundary conditions and some additional factors such as a debris-to-kernel ratio in an output of the harvester.

18 Claims, 9 Drawing Sheets

(56) References Cited

U.S. PATENT DOCUMENTS

| | | | | |
|---|---|---|---|---|
| 2018/0025254 A1* | 1/2018 | Wellington | .......... | G06V 10/993 |
| | | | | 382/110 |
| 2020/0051180 A1 | 2/2020 | Bedoya et al. | | |
| 2020/0077582 A1 | 3/2020 | Xu et al. | | |
| 2022/0110238 A1* | 4/2022 | Vandike | ............... | G05D 1/0278 |
| 2022/0132736 A1* | 5/2022 | Meyers | ............. | A01D 41/1277 |
| | | | | 460/7 |
| 2022/0132737 A1* | 5/2022 | Anderson | ............. | G06V 10/48 |
| | | | | 56/10.2 E |

\* cited by examiner

SYSTEM FOR CONTROLLING OPERATING CLEARANCE BETWEEN A CONCAVE ASSEMBLY AND A CROP PROCESSING ROTOR

CROSS REFERENCE TO RELATED APPLICATION

This application claims the benefit of U.S. Provisional Application No. 63/131,496, filed Dec. 29, 2020, which is hereby incorporated by reference in its entirety.

TECHNICAL FIELD

The present disclosure relates to systems for controlling operating clearance between a concave assembly and a crop processing rotor as well as enhancements thereof.

BACKGROUND

A crop gathered by a combine harvester can be processed by a processing system in the combine harvester. In some harvesters, the crop moves axially parallel to and helically around a rotational axis of a rotary processing device commonly referred to as a rotor. In some other harvesters, the crop moves in a transverse or tangential direction relative to the rotational axis of a rotary processing device commonly referred to as a threshing cylinder. In each case, the crop is processed between elements affixed to the periphery of the rotary device and stationary curved members with perforations in the form of threshing concaves or separating grates that partially wrap around a portion of the rotor.

Because processing systems in combine harvesters are often utilized in different operating conditions and to harvest crops of varying size, the running clearance in the region between the rotor and stationary processing members can be adjusted to accommodate such variables. Also, the concaves can be configured to shift downward away from the rotor if a foreign object or an excessive amount of crop flows into the processing system. However, the spring force applied on the concaves of such systems can be inconsistent. Also, known systems for adjusting the operating clearance between concave parts and crop processing rotors can be cumbersome and inefficient. And, known methods for controlling such adjustments can be unsuccessful at adapting to changing crop size and other varying operating conditions.

SUMMARY

Described herein are improved systems and methods for controlling operating clearance between a concave assembly and a crop processing rotor. In improving the controlling of operating clearance between a concave assembly and a crop processing rotor, the systems and methods overcome some technical problems in farming of crops. The systems and methods (or techniques) disclosed herein can provide specific technical solutions to at least overcome the technical problems mentioned in the background section and other parts of the application as well as other technical problems not described herein but recognized by those skilled in the art.

The techniques disclosed herein can control operating clearance between a concave assembly and a crop processing rotor of a combine harvester and such controlling of the operating clearance can be automated. The technologies can include a device configured to estimate respective dimensions of kernels of a crop harvested by a combine harvester as well as determine boundary conditions for the operating clearance based on the estimated respective dimensions of the kernels. Also, the boundary conditions are related to respective central core sizes (such as respective cob sizes) which can be determined based on the estimated respective dimensions of the kernels. The determination can include deriving the boundary conditions from a table including correlations between kernel dimensions and central core sizes, and the table can be enhanced by a feedback loop. The operating clearance can be automatically adjusted according to the determined boundary conditions and some additional factors such as a debris-to-kernel ratio in an output of the harvester.

In some embodiments, existing grain quality sensors can capture images of a crop as it is harvested or soon after it is harvested. Such sensors can be in a combine harvester or in a bin receiving processed crops from a harvester. This way the images of the processed crops are captured soon after harvesting. Such image data (which can be recorded in real time) can improve the controlling of operating clearance between a concave assembly and a crop processing rotor and can facilitate automation of the controlling of the operating clearance. The image data can be used as input for determining central core size and then such a determination can be used as input for determining and controlling operating clearance automatically. Such a technique can resolve the technical problems mentioned in the background section and other parts of the application as well as other technical problems not described herein but recognized by those skilled in the art.

With respect to some embodiments, disclosed herein are computerized methods for controlling operating clearance between a concave assembly and a crop processing rotor, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for improved controlling of operating clearance between a concave assembly and a crop processing rotor.

For example, in some embodiments, a method includes receiving, by a computing device, image data associated with kernels harvested by a combine harvester and estimating, by the computing device, respective dimensions of the kernels based on the image data. The method also includes determining, by the computing device, respective central core sizes based on the estimated respective dimensions of the kernels and a table including correlations between kernel dimensions and central core sizes as well as controlling, by the computing device, operating clearance between a concave assembly and a crop processing rotor of the combine harvester based the determined respective central core sizes. In some embodiments of the method, the kernels are corn kernels, the estimated respective dimensions of the kernels are estimated dimensions of corn kernels, the respective central core sizes are cob sizes, and the table is a table including correlations between corn kernel dimensions and cob sizes. In some embodiments, the method includes capturing, by a sensor, respective images of the kernels. In such embodiments, the method includes generating, by the sensor, the image data associated with the kernels based on the respective images of the kernels as well as communicating, by the sensor, the image data to the computing device In some embodiments, the method includes determining, by the computing device, a minimum central core size and a maximum central core size based on the estimated respective dimensions of the kernels and the table including correlations between kernel dimensions and central core sizes. In such embodiments, the method includes determining, by the computing device, boundary conditions for the operating clearance based on the minimum central core size and the maximum central core size and controlling, by the computing device, the operating clearance based the determined boundary conditions. In some embodiments, the boundary conditions include a range of shortest distances between the concave assembly and the crop processing rotor. For example, the range includes a maximum and minimum shortest distance between the concave assembly and the crop processing rotor. The maximum and minimum shortest distances are derived from the determined minimum central core size and the determined maximum central core size, respectively.

In some embodiments, the method includes receiving, by the computing device, sensed additional conditions related to an output of the combine harvester. In such embodiments, the method includes adjusting, by the computing device, the boundary conditions for the operating clearance based on the sensed additional conditions and controlling, by the computing device, the operating clearance based the adjusted boundary conditions. In some embodiments, the sensed additional conditions include a debris-to-kernel ratio.

In some embodiments, the method includes communicating, by the computing device, the determined boundary conditions over a network to a user interface device, receiving, by the computing device, adjustments to the boundary conditions from the user interface device, and controlling, by the computing device, the operating clearance based on the received adjustments to the boundary conditions. In some embodiments, the communication of the determined boundary conditions to the user interface device occurs during or after processing of the kernels by the combine harvester. Also, in some embodiments, the method includes displaying the determined boundary conditions by a display of the user interface device. In some embodiments, the method includes displaying graphical user interface elements by the display, and the graphical user interface elements are configured to be manipulated by an operator to control adjustments to the boundary conditions.

With respect to some embodiments, a system is provided that includes at least one computing device configured to provide improved ways for controlling operating clearance between a concave assembly and a crop processing rotor. And, with respect to some embodiments, a method, such as one of the aforesaid methods, is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

These and other important aspects of the invention are described more fully in the detailed description below. The invention is not limited to the particular methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 1:
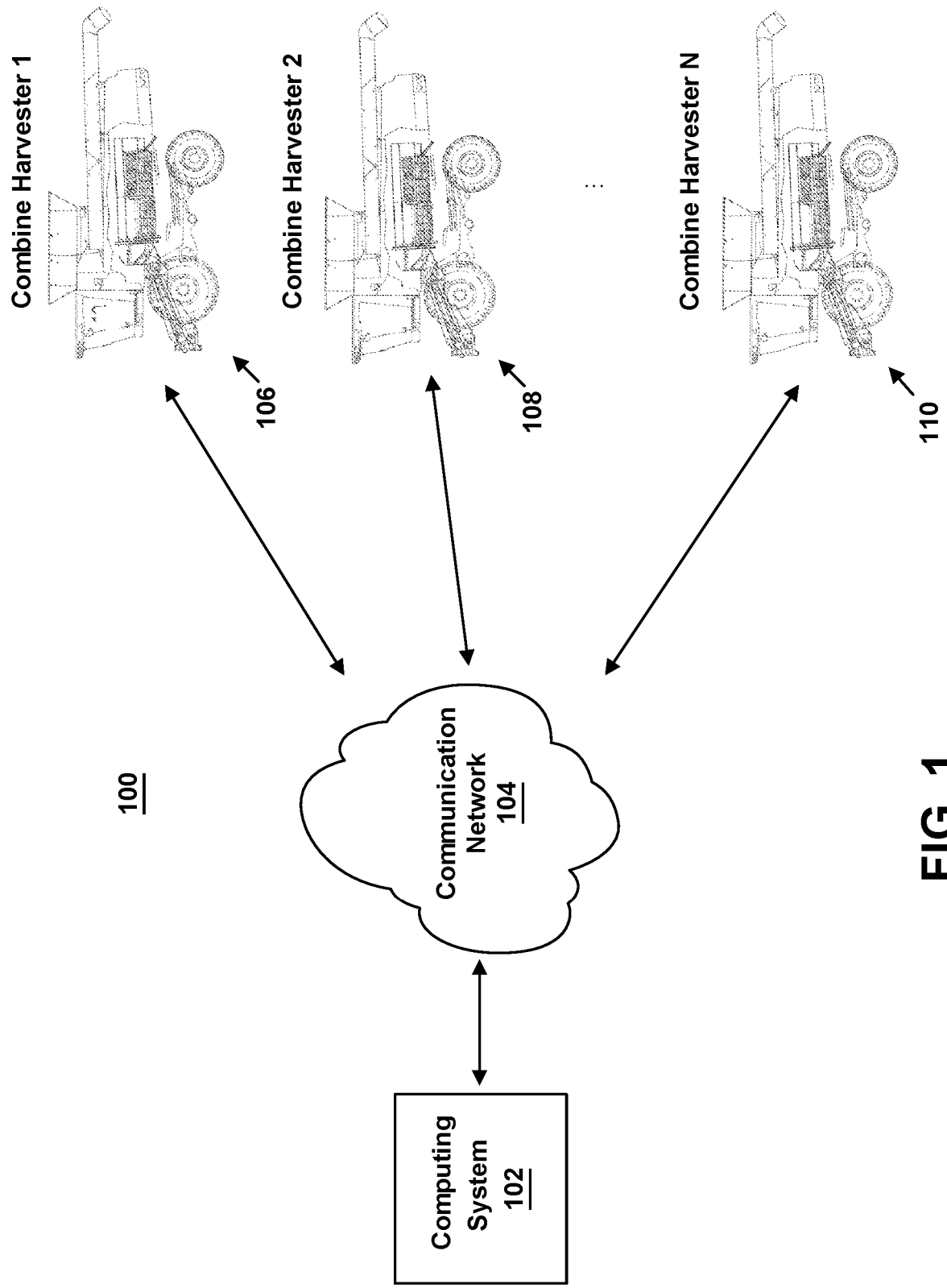
FIG. 1 illustrates an example network of combine harvesters that communicate with a computing system through a communication network, in accordance with some embodiments of the present disclosure.

FIG. 1 illustrates network 100 including at least one computing system (e.g., see computing system 102), a communication network 104, and combine harvesters (e.g., see combine harvesters 106, 108, and 110). The combine harvesters are shown communicating with computing system 102 through a communication network 104. Not shown in FIG. 1, the combine harvesters of the network 100 can each include its own computing system (e.g., see computing system 400 shown in FIG. 5). The computing systems in each combine harvester can include a processor, memory, a communication interface and one or more sensors that can make the harvesters individual computing devices. In the case of the communication network 104 including the Internet, the combine harvesters 106, 108, and 110 can be considered Internet of Things (IoT) devices.

The communication network 104 can include one or more local area networks (LAN(s)) and/or one or more wide area networks (WAN(s)). The communication network 104 can include the Internet and/or any other type of interconnected communications network. The communication network 104 can also include a single computer network or a telecommunications network. More specifically, the communication network 104 can include a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

At least each shown component of the network 100 (including computing system 102, communication network 104, and combine harvesters 106, 108, and 110) can be or include a computing system which can include memory that can include media. The media can include or be volatile memory components, non-volatile memory components, or a combination of thereof. In general, each of the computing systems can include a host system that uses memory. For example, the host system can write data to the memory and read data from the memory. The host system can be a computing device that includes a memory and a data processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

Figure 2:
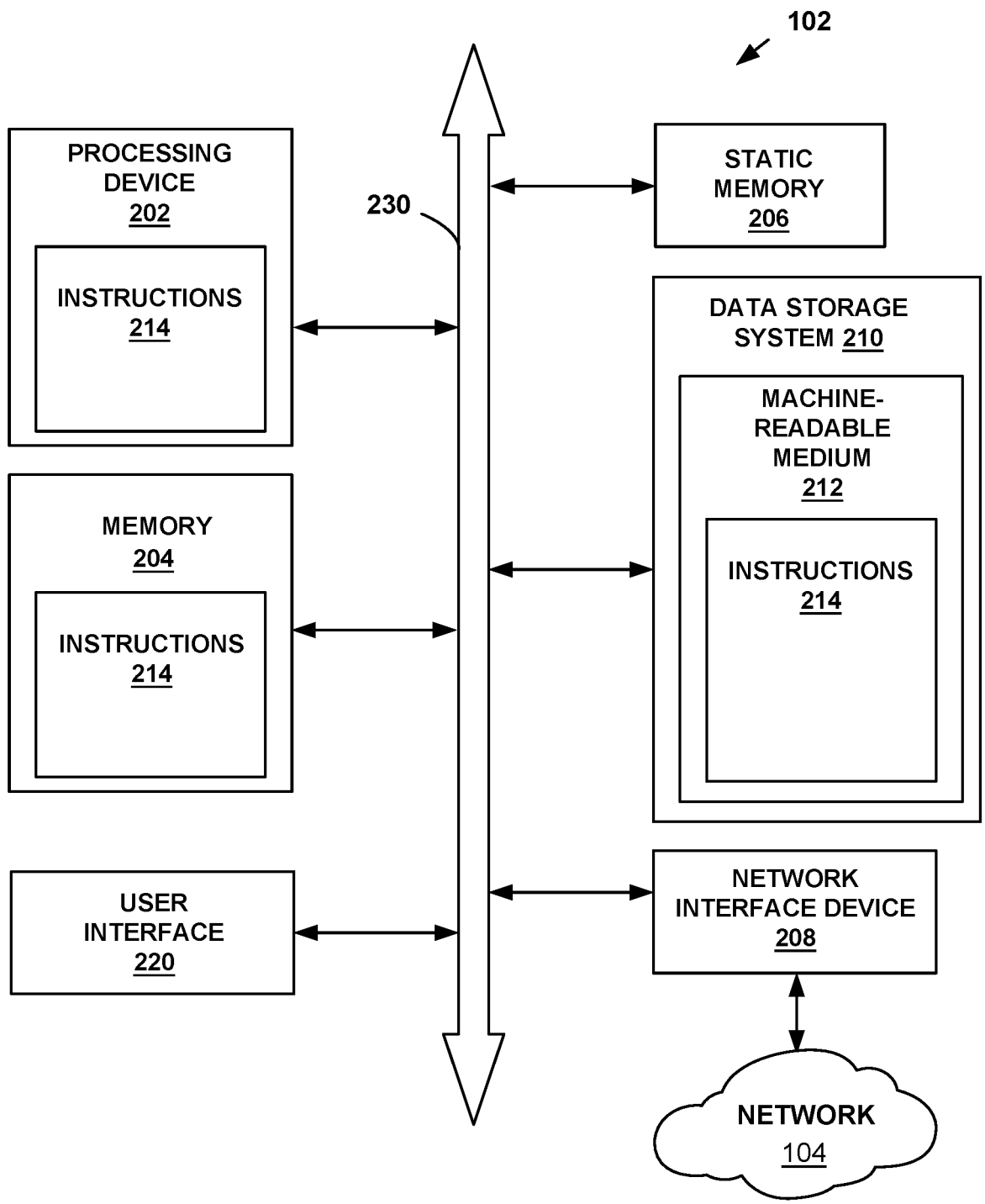
FIG. 2 illustrates is a block diagram of example aspects of the computing system shown in FIG. 1, in accordance with some embodiments of the present disclosure.

FIG. 2 is a block diagram of example aspects of the computing system 102. FIG. 2 illustrates parts of the computing system 102 within which a set of instructions, for causing the machine to perform any one or more of the methodologies discussed herein, can be executed. In some embodiments, the computing system 102 can correspond to a host system that includes, is coupled to, or utilizes memory or can be used to perform the operations performed by any one of the computing devices, data processors, user interface devices, and sensors described herein. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 102 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 230.

The processing device 202 represents one or more general-purpose processing devices such as a microprocessor, a central processing unit, or the like. More particularly, the processing device can be a microprocessor or a processor implementing other instruction sets, or processors implementing a combination of instruction sets. The processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 214 for performing the operations discussed herein. The computing system 102 can further include a network interface device 208 to communicate over the communication network 104 shown in FIG. 1.

The data storage system 210 can include a machine-readable storage medium 212 (also known as a computer-readable medium) on which is stored one or more sets of instructions 214 or software embodying any one or more of the methodologies or functions described herein. The instructions 214 can also reside, completely or at least partially, within the main memory 204 and/or within the processing device 202 during execution thereof by the computing system 102, the main memory 204 and the processing device 202 also constituting machine-readable storage media.

In some embodiments, the instructions 214 include instructions to implement functionality corresponding to any one of the computing devices, data processors, user interface devices, I/O devices, and sensors described herein. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 102 includes user interface 220 that can include a display and implement functionality corresponding to any one of the user interface devices disclosed herein. A user interface, such as user interface 220, or a user interface device described herein can include any space or equipment where interactions between humans and machines occur. A user interface described herein can allow operation and control of the machine from a human user, while the machine can simultaneously provide feedback information to the user. Examples of a user interface (UI), or user interface device include the interactive aspects of computer operating systems (such as graphical user interfaces), machinery operator controls, and process controls. A UI described herein can include one or more layers, including a human-machine interface (HMI) that interfaces machines with physical input hardware such as keyboards, mice, or pads, and output hardware such as monitors, speakers, and printers. Such a UI can also include a device that implements an HMI—also known as a human interface device (HID). Additional UI layers can be included in UI described herein including tactile UI (touch), visual UI (sight), auditory UI (sound), olfactory UI (smell), and gustatory UI (taste). Such a UI can also include composite user interfaces (CUIs), which are UIs that interact with two or more human senses. In some embodiments, a graphical user interface (GUI), which is composed of a tactile UI and a visual UI capable of displaying graphics, or any other type of UI can present information related to controlling of operating clearance between a concave assembly and a crop processing rotor to a user of the system. Sound can also be added to a GUI, such that the UI is a multimedia user interface (MUI) can provide control boundaries for controlling operating clearance between a concave assembly and a crop processing rotor to the user via visual and audio means. UI described herein can also include virtual reality or augmented reality aspects.

Figure 3:
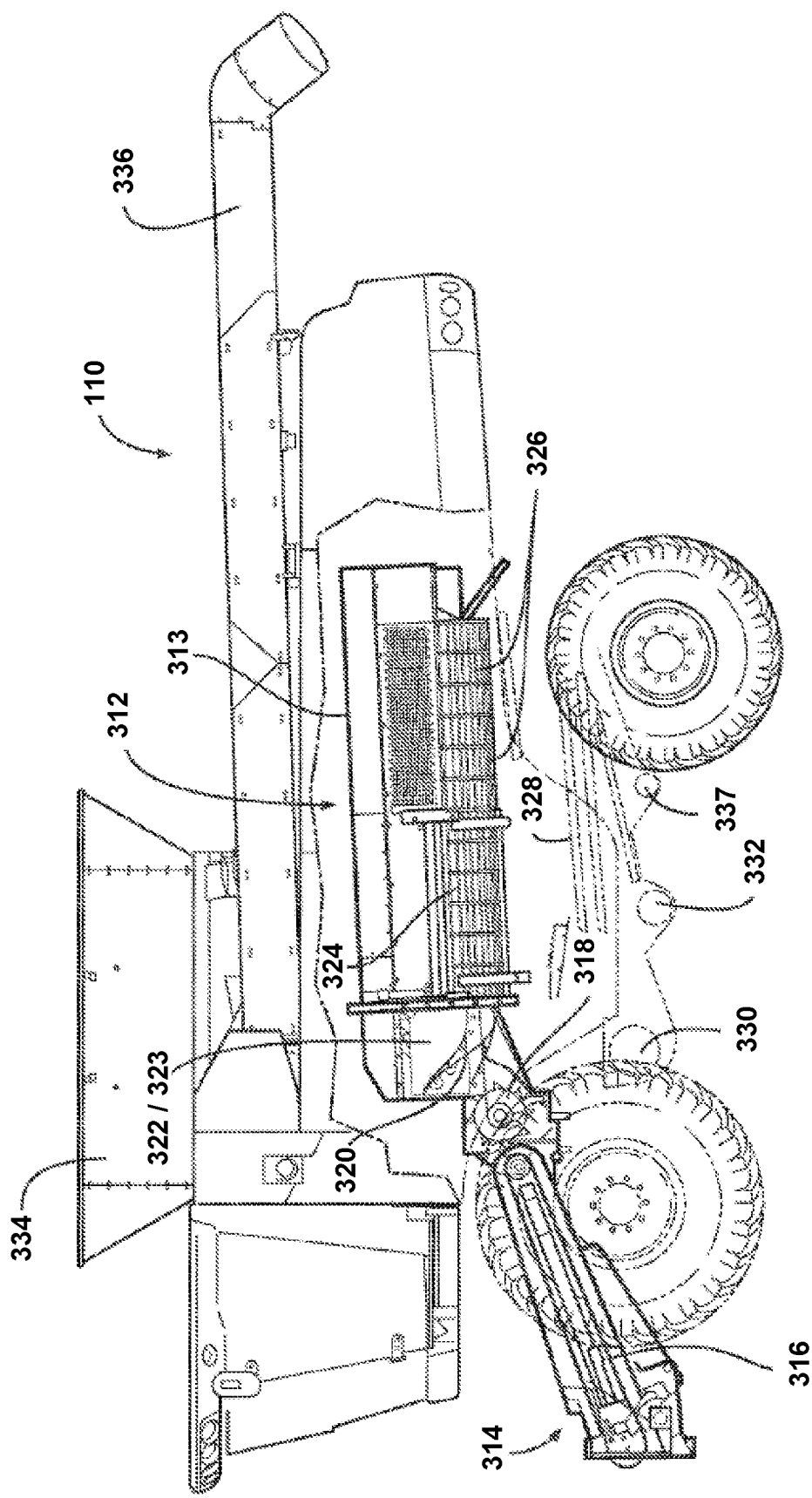
FIG. 3 illustrates a schematic side view of one of the combine harvesters shown in FIG. 1 with some portions of the harvester being broken away to reveal internal details of construction, in accordance with some embodiments of the present disclosure.

FIG. 3 illustrates a schematic side view of the combine harvester 110 shown in FIG. 1 with some portions of the harvester being broken away to reveal internal details of construction. The combine harvester 110 has a single axial flow processing system that extends generally parallel with the path of travel of the harvester. It is to be understood that such a harvester is being used to illustrate principals herein and the subject matter described herein is not limited to harvesters with processing systems designed for axial flow, nor to axial flow harvesters having only a single processing system. For the sake of simplicity in explaining the principles, this specification will proceed utilizing a single axial flow processing system as the primary example.

The combine harvester 110 includes a harvesting header (not shown) at the front of the machine that delivers collected crop materials to the front end of a feeder house 314. Such materials are moved upwardly and rearwardly within feeder house 314 by a conveyer 316 until reaching a beater 318 that rotates about a transverse axis. Beater 318 feeds the material upwardly and rearwardly to a rotary processing device, in the illustrated instance to a rotor 322 having an infeed auger 320 on the front end thereof. Infeed auger 320, in turn, advances the materials axially into the processing system 312 for threshing and separating. The processing system 312 is housed by processing system housing 313. In other types of systems, conveyer 316 may deliver the crop directly to a threshing cylinder.

Figure 4:
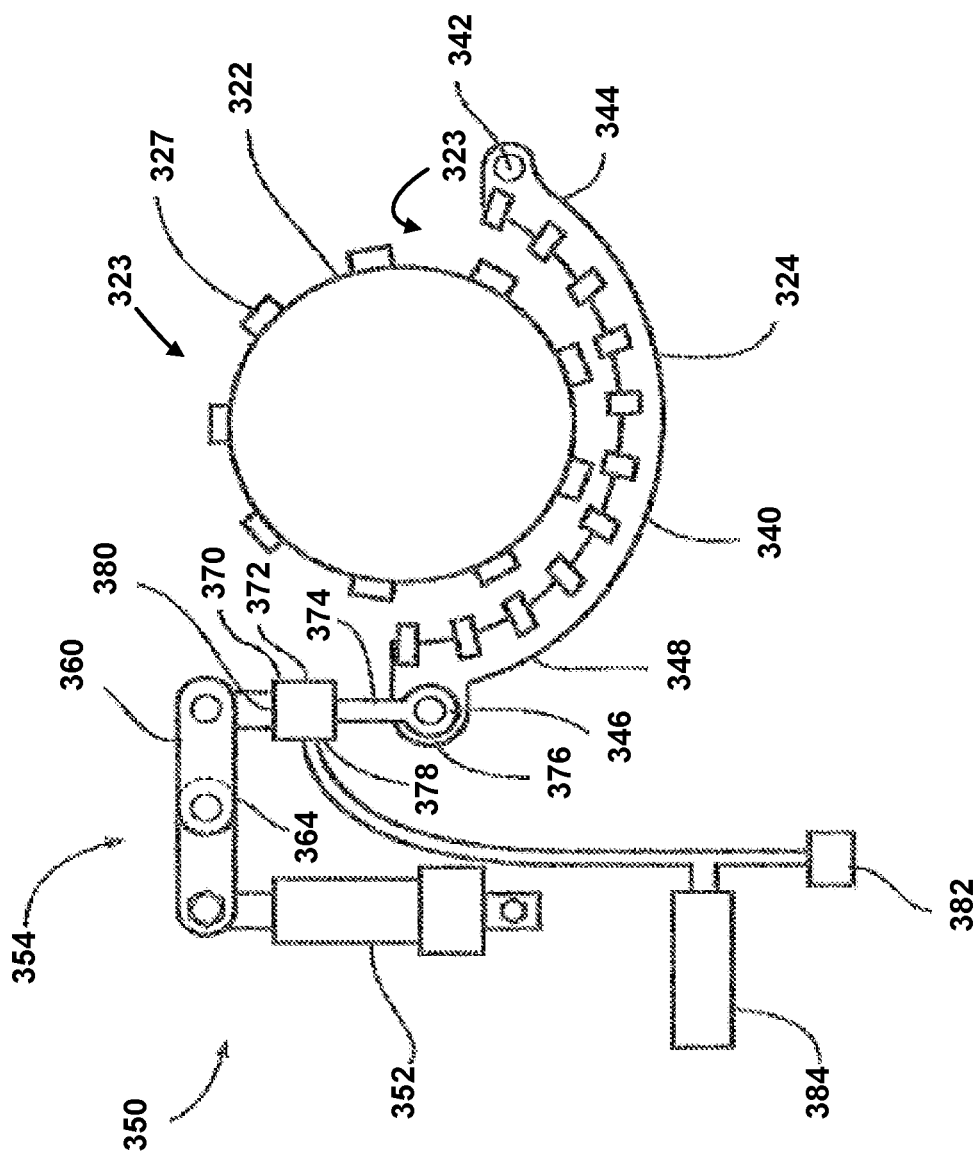
FIG. 4 illustrates is a rear elevation view of a processing system having a threshing concave assembly, in accordance with some embodiments of the present disclosure.

FIG. 4 shows a rear elevation view of the processing system 312 shown in FIG. 3 having a concave assembly 324 (e.g., a threshing concave assembly), in accordance with some embodiments of the present disclosure. FIG. 4 illustrates a rear elevation view of the processing system 312 with some portions of the processing system being broken away to reveal internal details of construction.

The crop materials entering the processing system 312 can move axially and helically therethrough during threshing and separating. During such travel, the crop materials are threshed and separated by rotor 322 operating in chamber 323 which concentrically receives the rotor 322. The lower part of the chamber 323 contains a concave assembly 324 and a separator grate assembly 326. Rotation of the rotor 322 impels the crop material rearwardly in a generally helical direction about the rotor 322. A plurality of rasp bars 327 and separator bars (not shown) mounted on the cylindrical surface of the rotor 322 cooperate with the concave assembly 324 and separator grate assembly 326 to thresh and separate the crop material, with the grain escaping laterally through concave assembly 324 and separator grate assembly 326 into cleaning mechanism 328. Bulkier stalk and leaf materials are retained by the concave assembly 324 and the separator grate assembly 326 and are impelled out the rear of processing system 312 and ultimately out of the rear of the combine harvester 110.

A blower 330 forms part of the cleaning mechanism 328 and provides a stream of air throughout the cleaning region below processing system 312 and directed out the rear of the combine harvester 110 so as to carry lighter chaff particles away from the grain as it migrates downwardly toward the bottom of the machine to a clean grain auger 332. Clean grain auger 332 delivers the clean grain to an elevator (not shown) that elevates the grain to a storage bin 334 on top of the combine harvester 110, from which it is ultimately unloaded via an unloading spout 336. A returns auger 337 at the bottom of the cleaning region is operable in cooperation with other mechanism (not shown) to reintroduce partially threshed crop materials into the front of processing system 312 for an additional pass through the processing system 312.

The concave assembly 324 is made of a plurality of concaves 340 positioned axially along the forward portion of the rotor 322. Each of the concaves 340 wrap around a bottom portion of the rotor 322 in a circumferential manner. The concave assembly 324 can include concaves 340 (such as six identical concaves). The concave assembly 324 can contain more or fewer concaves 340 in other embodiments. The concaves 340 in the concave assembly 324 also can be arranged in side-by-side pairs with one concave of each pair positioned along one side of the rotor 322 and the other concave of each pair positioned on the opposite side of the rotor 322. The concave assembly 324 is adapted to pivot about pivot point 342 to move the concaves 340 toward and away from rotor 322 so as to adjust the running clearance between rotor 322 and concave assembly 324 and to change the shape of the threshing region. The pivot point 342, about which the concaves 340 pivot, is located at one end 344 of the concaves 340. The concaves 340 are mounted on rock shaft 346 at an opposite end 348 of the concaves 340. The rock shaft 346 can be located at other positions in other embodiments, such as at the bottom of the concave assembly 324.

The controllers described herein can be or include a data processing machine, such as computing system 102 and computing system 400, and can include a set of instructions, for causing the machine to perform any one or more of the methodologies discussed herein, when the instructions are executed by the machine. And, the output of such methodologies can be used as input to control the space between the rotor 322 and the concave assembly 324 and/or the separator grate assembly 326 via electromechanical components coupled electromechanically to the data processing machine (such as electromechanical actuators, linkage assemblies, cranks, shafts, and other mechanisms suitable for transmitting electrical signals and movement). For example, the data processing machine can determine boundary conditions for the aforesaid threshing and separating of the crop material and then control the electromechanical components to control the space between the rotor 322 and the concave assembly 324 and/or the separator grate assembly 326 by sending electrical signals to the electromechanical components.

In some embodiments, an operating mechanism 350 can be communicatively coupled to the data processing machine so that the data processing machine can control the space between the rotor 322 and the concave assembly 324 and/or the separator grate assembly 326 via electromechanical adjustment components of the operating mechanism 350. For instance, the operating mechanism 350 can adjustably move the concave assembly 324 toward and away from rotor 322 to adjust the position of the concave assembly 324 relative to rotor 322 at least partially according to control signals sent from the data processing machine (such as control signals related to and derived from determined boundary conditions for operating clearance between the rotor and the concave assembly). The operating mechanism 350 contains an actuator 352 and a linkage assembly 354 connecting the actuator 352 to the concave assembly 324. The actuator 352 can be remotely operable, such as from the cab of combine harvester 110, and can be operable automatically, at least partially, according to control signals sent from the data processing machine that are related to and derived from determined boundary conditions for operating clearance between the rotor and the concave assembly. In some embodiments, the actuator 352 includes an electrically powered linear actuator. The actuator 352 can also be selected from or include a number of different actuating devices known in the art, such as a hydraulic cylinder or a turnbuckle. In some embodiments, a control rod of the actuator 352 can be connected pivotally at its end to the linkage assembly 354.

The linkage assembly 354 transmits the movement of the actuator 352 to the concave assembly 324. As shown, the linkage assembly 354 includes a swing arm 360 and bearing blocks 364 connected to the combine harvester 110. The linkage assembly 354 can include cranks, shafts, and other mechanisms suitable for transmitting movement initiated by the operating mechanism 350 to the concave assembly 324. The crop materials are introduced into the front end of the processing system 312 and move helically within and about the rotor housing in a counterclockwise direction. The threshing action occurs in a threshing region located generally in the bottom half of the processing system 312, between the periphery of rotor 322 and concave assembly 324. When the actuator 352 is retracted, the linkage assembly 354 moves the concave assembly 324 inwardly toward rotor 322. When actuator 352 is extended into an open position, the concave assembly 324 is moved away from rotor 322. As the concave assembly 324 is adjusted toward an open position, the threshing region is reshaped to thereby decrease the aggressiveness of the threshing action in that area.

The linkage assembly 354 includes a hydraulic cylinder 370 in its connection between the actuator 352 and the concave assembly 324. The hydraulic cylinder 370 can apply a force to the concave assembly 324 to control the pressure put on the crop while the rotor 322 is operating while permitting the concave assembly 324 to shift downward away from the rotor 322 if a foreign object or an excessive amount of crop flow is ingested by the processing system 312. As shown, a cylinder base 372 of the hydraulic cylinder 370 is connected to the swing arm 360 and a piston rod 374 extending from the hydraulic cylinder 370 is attached to the rock shaft 346 of the concave assembly 324. In other embodiments, the hydraulic cylinder 370 can connect between other portions of the linkage assembly 354. The piston rod 374 can connect to the concave assembly 324 with any mounting attachment 376, such as a rod-clevis or rod-eye. The hydraulic cylinder 370 can be a single acting cylinder with hydraulic fluid entering through a port 378 at one end of the hydraulic cylinder 370, which then moves a piston 380 to extend the piston rod 374 and is controlled by the pressure of the hydraulic fluid ported to the hydraulic cylinder 370. A hydraulic supply, such as hydraulic supply 382 (which can be a pump), can be used to control the pressure of hydraulic fluid ported to the hydraulic cylinder 370.

An accumulator 384 is located between the hydraulic supply 382 and the hydraulic cylinder 370. The accumulator 384 can use a compressed gas, spring or other energy storing means to absorb the shock and a piston, bladder, or diaphragm to separate the energy storing means from the hydraulic fluid. The accumulator 384 is plumbed in series with the hydraulic cylinder 370 which gives the concave assembly 324 the ability to move when the concaves 340 need to move to let a large mat of crop through. The accumulator 384 permits the concave assembly 324 to open while supplying a constant pressure on the crop mat. The hydraulic supply 382 can be selectively controlled from the cab of the combine harvester 110 during operations to make changes to the concave pressure put on the crop by the concave assembly 324 while the combine harvester is operating. Also, in some embodiments, the hydraulic supply 382 can be automatically controlled, at least partially, from control signals sent from the data processing machine (such as control signals related to and derived from determined boundary conditions for operating clearance between the rotor and the concave assembly).

Figure 5:
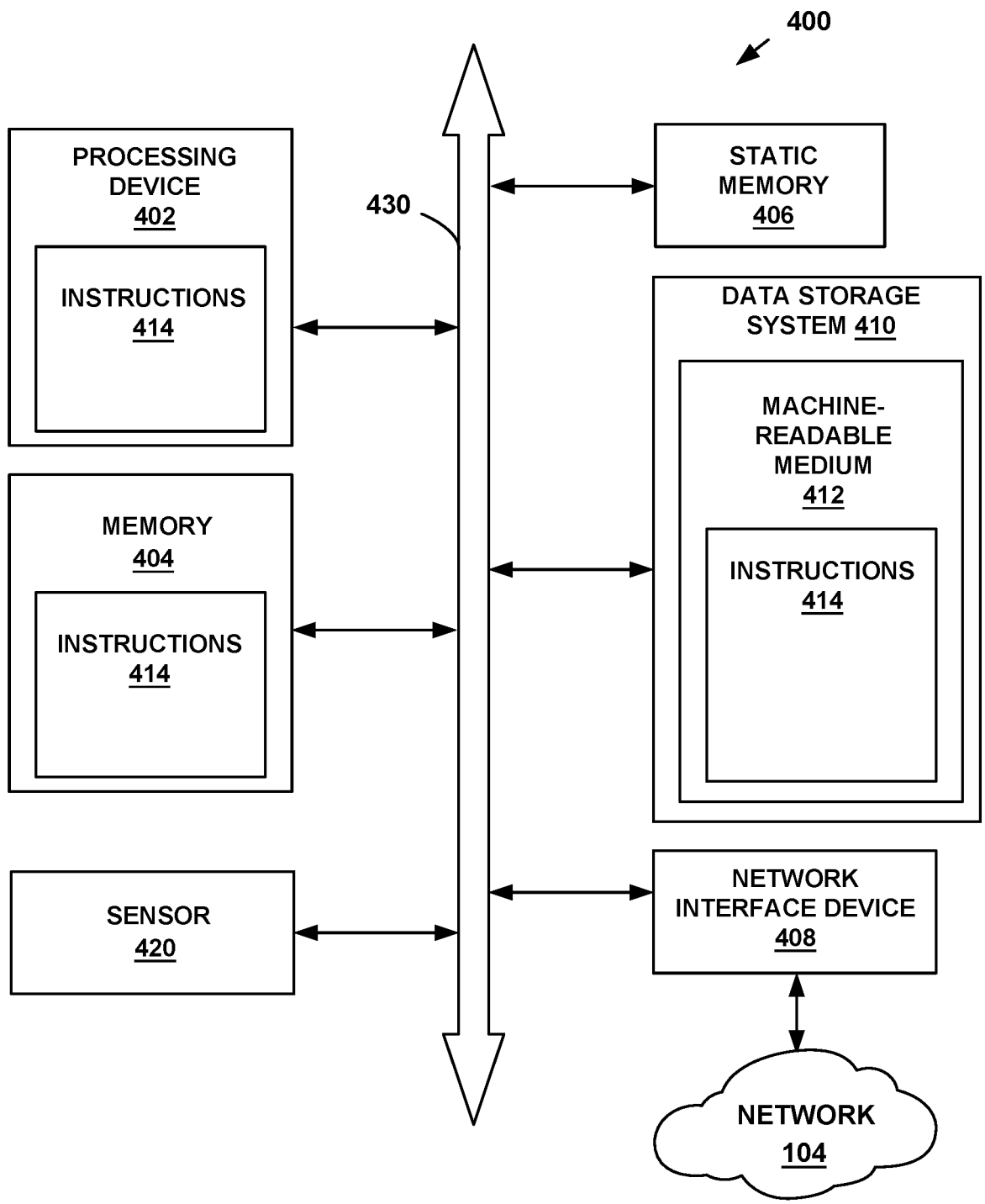
FIG. 5 illustrates is a block diagram of example aspects of an example computing system that can be a part of a combine harvester, such as that harvester shown in FIG. 3, in accordance with some embodiments of the present disclosure.

FIG. 5 illustrates is a block diagram of example aspects of computing system 400 that can be a part of a combine harvester, such as combine harvester 110 shown in FIGS. 1 and 3. FIG. 5 illustrates parts of the computing system 400 within which a set of instructions, for causing the machine to perform any one or more of the methodologies discussed herein, can be executed. In some embodiments, the computing system 400 can correspond to a host system that includes, is coupled to, or utilizes memory or can be used to perform the operations performed by any one of the computing devices, data processors, user interface devices, and sensors described herein. In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. The machine can be a PC, a tablet PC, a STB, a PDA, a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 400 includes a processing device 402, a main memory 404 (e.g., read-only memory, flash memory, DRAM, etc.), a static memory 406 (e.g., flash memory, SRAM, etc.), and a data storage system 410, which communicate with each other via a bus 430.

The processing device 402 represents one or more general-purpose processing devices such as a microprocessor, a central processing unit, or the like. More particularly, the processing device can be a microprocessor or a processor implementing other instruction sets, or processors implementing a combination of instruction sets. The processing device 402 can also be one or more special-purpose processing devices such as an ASIC, a FPGA, a DSP, network processor, or the like. The processing device 402 is configured to execute instructions 414 for performing the operations discussed herein. The computing system 400 can further include a network interface device 408 to communicate over the communication network 104 shown in FIG. 1.

The data storage system 410 can include a machine-readable storage medium 412 (also known as a computer-readable medium) on which is stored one or more sets of instructions 414 or software embodying any one or more of the methodologies or functions described herein. The instructions 414 can also reside, completely or at least partially, within the main memory 404 and/or within the processing device 402 during execution thereof by the computing system 400, the main memory 404 and the processing device 402 also constituting machine-readable storage media.

In some embodiments, the instructions 414 include instructions to implement functionality corresponding to any one of the computing devices, data processors, user interface devices, I/O devices, and sensors described herein. While the machine-readable storage medium 412 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 400 includes a sensor 420 that implements functionality corresponding to any one of the sensors disclosed herein. In some embodiments, the sensor 420 can include a camera or another type of optical instrument. The sensor 420 can be or include a device, a module, a machine, or a subsystem that can detect objects, events or changes in its environment and send the information to other electronics or devices, such as a computer processor or a computing system in general. The sensor 420 can be configured to capturing an image or data of a group of kernels, whether or not the kernels have been cleaned. The sensor 420 can also be configured to generate image data of the kernels based on the image of the plurality of kernels and communicate the image data to a computing device or an embedded processor within the sensor. In some embodiments, a processor within the sensor can be configured to receive image data of the kernel and determine one or more dimensions of a kernel of the group of kernels based on the image data. The processor within the sensor can also be configured to determine a central core size based on the determined dimension(s) and a table including correlations between kernel dimensions and central core sizes.

The sensor 420 or any sensor described herein can include an image sensor. The image sensor can include metal-oxide-semiconductor (MOS) technology or digital semiconductor image sensors. Such sensors can include a charge-coupled device (CCD) or a CMOS sensor. The sensors described herein can also include or be connected to a device that can compress an image of kernels using a known digital image compression technology. The sensors described herein can also include or be connected to a device that includes a digital signal processor (DSP).

Figure 6:
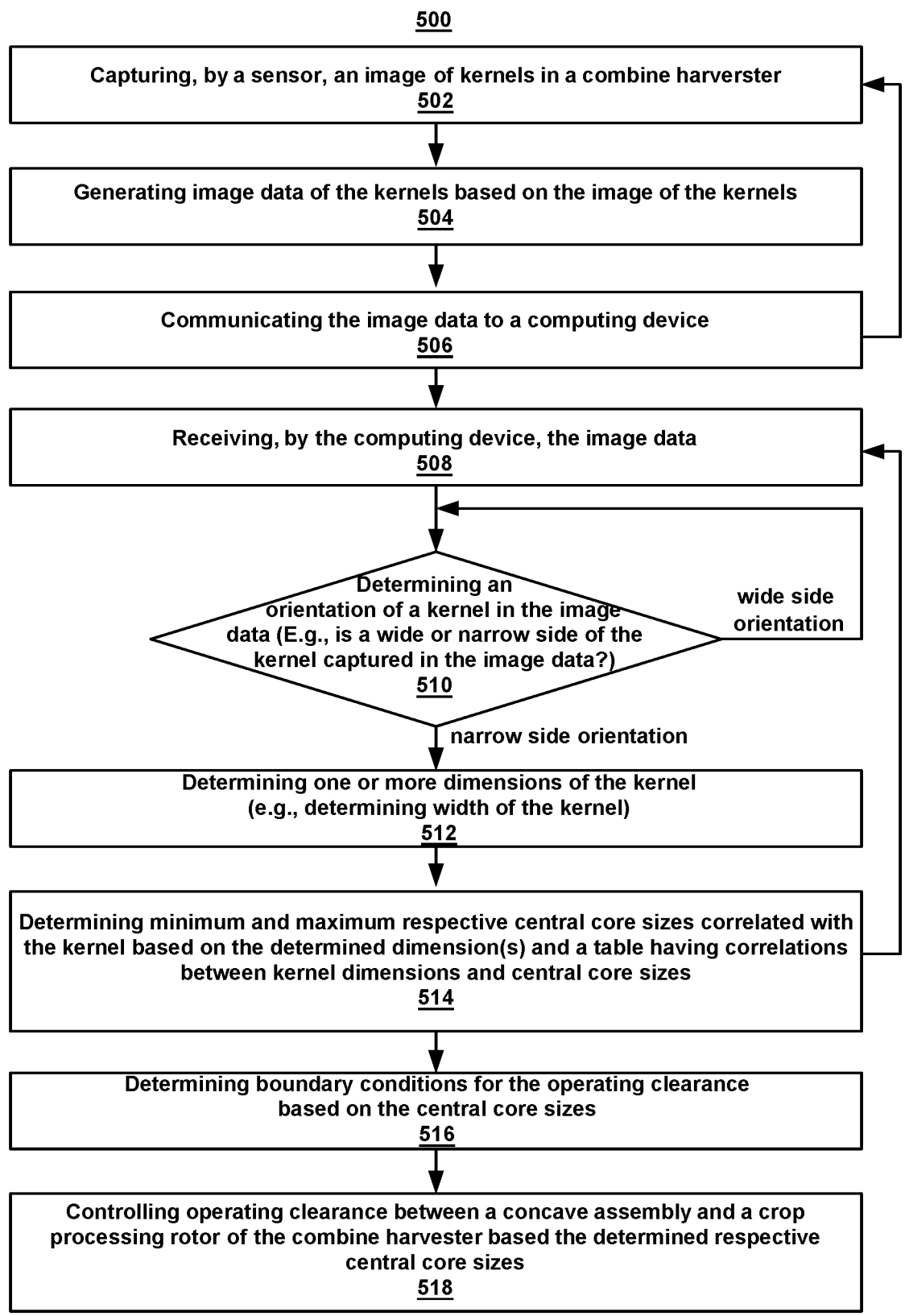
FIG. 6 illustrates an example method in accordance with some embodiments of the present disclosure.
Figure 8:
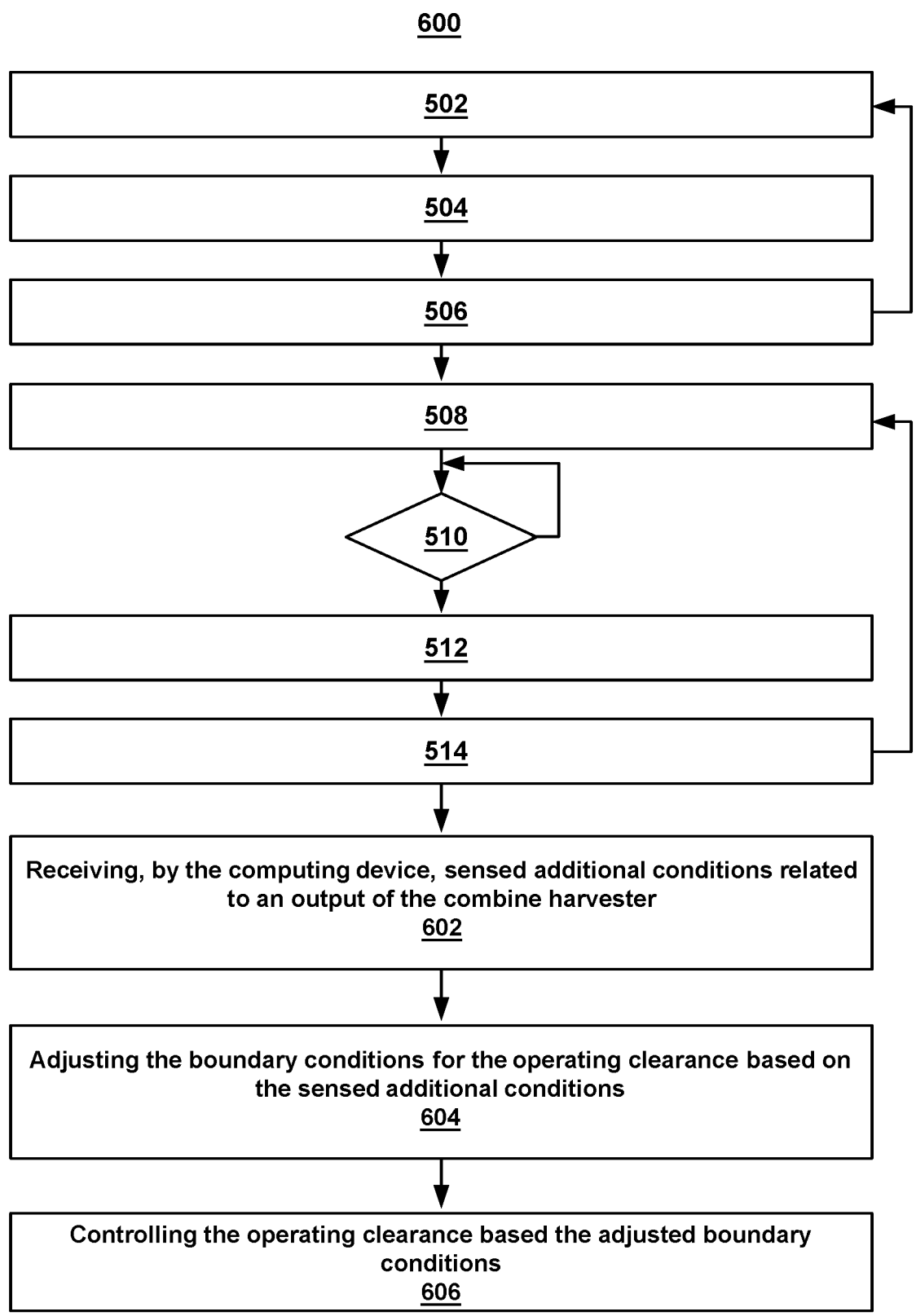
FIGS. 8 and 9 illustrate additional example methods in accordance with some embodiments of the present disclosure.
Figure 9:
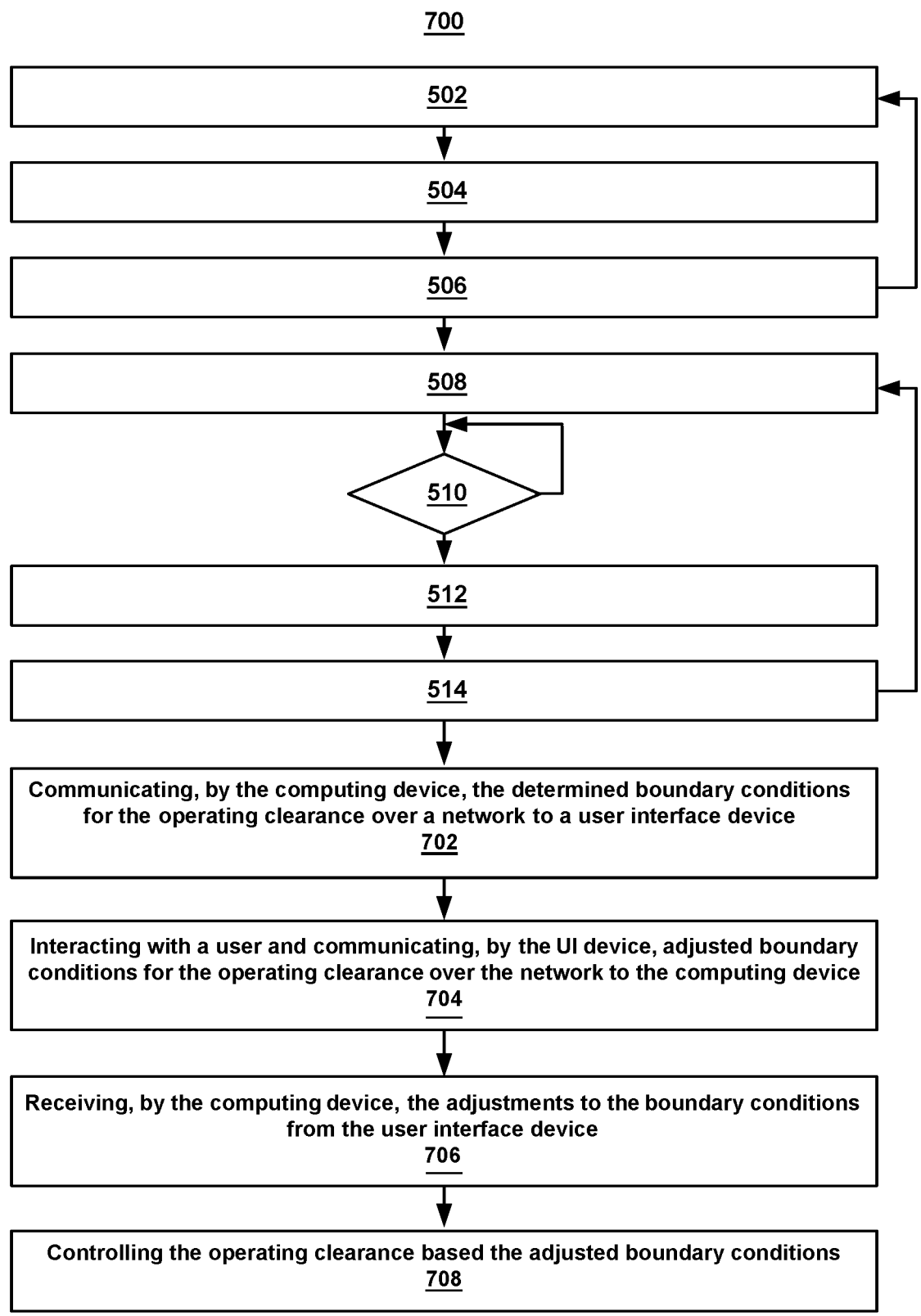

FIGS. 6, 8, and 9 illustrate methods 500, 600, and 700, respectively. Specifically, FIG. 6 shows the steps of method 500. In some embodiments, steps 502, 504, and 506 are performed by a sensor—such as the sensor 420 shown in FIG. 5. In some embodiments, steps 508, 510, 512, 514, 516, and 518 are performed by a computing device—such as the computing system 102 as shown in FIGS. 1 and 2 or computing system 400 as shown in FIG. 5. In some embodiments, step 518 is performed by a combination of a computing device and one or more electro-mechanical components that operate with or a part of a crop processing system (such as the processing system 312). In some embodiments, steps 508, 510, 512, 514, 516, 518, 602, 604, 606, 702, 706, and 708 are performed by a computing device—such as the computing system 102 or computing system 400. And, in some embodiments, step 704 is performed by a UI device—such as a UI device that includes a display (e.g., see user interface 220). Also, in some embodiments, a UI can perform user interaction operations associated with steps 518, 606, and 708. For example, a user can interact with a UI to at least partially control operating clearance of the concave assembly and the crop processing rotor manually. The computing device can for the most part control the operating clearance, but in such embodiments, a UI can provide an interface for a user to make adjustments to the control of the operating clearance.

Method 500 starts with step 502, which includes capturing, by a sensor (such as the sensor 420), an image of a plurality of kernels of a crop. Step 504 of method 500 includes generating, by the sensor, image data of the plurality of kernels based on the image of the plurality of kernels. The method 500 also includes, at step 506, communicating, by the sensor, the image data to the computing device. The sensor performing steps 502 to 506 can be attached to a surface facing equipment moving the plurality of kernels from a crop processing system (e.g., see processing system 312 as shown in FIG. 3) to a storage bin (e.g., see storage bin 334) in the combine harvester such that the sensor captures images of kernels as the kernels are moved by the equipment. The equipment can include a conveyor or an elevator. The sensor and the computing device can be in the combine harvester. For example, the sensor can be within the housing, such as processing system housing 313, of the crop processing system so that the sensor can capture images of the crop immediately after it has been processed by the processing system. Also, for example, the sensor can be on a wall facing an auger that delivers the clean grain to an elevator or conveyor that elevates the grain to a storage bin on top of the combine harvester—e.g., see auger 332 and storage bin 334 shown in FIG. 3. Also, the sensor can be on a wall facing a returns auger (e.g., see return auger 337). In some embodiments, the sensor can be in the combine harvester and the computing device can be remote to the harvester. In such embodiments, the sensor can communicate to the computing device via a wide area network—e.g., communication network 104 can include the wide area network.

The method 500 continues with step 508, which includes receiving, by a computing device, e.g., see computing system 102 or 400, the image data of the plurality of kernels of the crop. In other words, at step 508, the method includes receiving, by the computing device, image data associated with kernels harvested by the combine harvester. The image data corresponds to harvested crop located in a combine harvester—such as one of combine harvesters 106, 108, and 110. The image data of the plurality of kernels can include image data of kernels located in the harvester after or during processing of the crop by the harvester. The image data of the plurality of kernels can include image data of kernels being transferred to a storage bin in the harvester (e.g., see storage bin 334) on a conveyer or elevator after the processing of the crop. The image data of the plurality of kernels can include image data of kernels stored in a storage bin in the harvester after the processing of the crop.

At step 510 of the method 500, the method includes determining, by the computing device, orientation of a kernel of the plurality of kernels based on the image data and image processing. The orientation of a kernel can be a narrow side orientation 522 or a wide side orientation 524 (such as shown in an illustrated image of kernels 520 depicted in FIG. 7). If the kernel is determined to have a narrow side orientation, then the method continues with determining one or more dimensions of the kernel, at step 512. For example, the method continues with determining a width of the kernel at step 512. Otherwise, such as if the kernel is determined to have a wide side orientation, step 510 is repeated with a different kernel of the plurality of kernels. Step 510 is repeated until at least one kernel with a narrow side orientation is identified.

Figure 7:
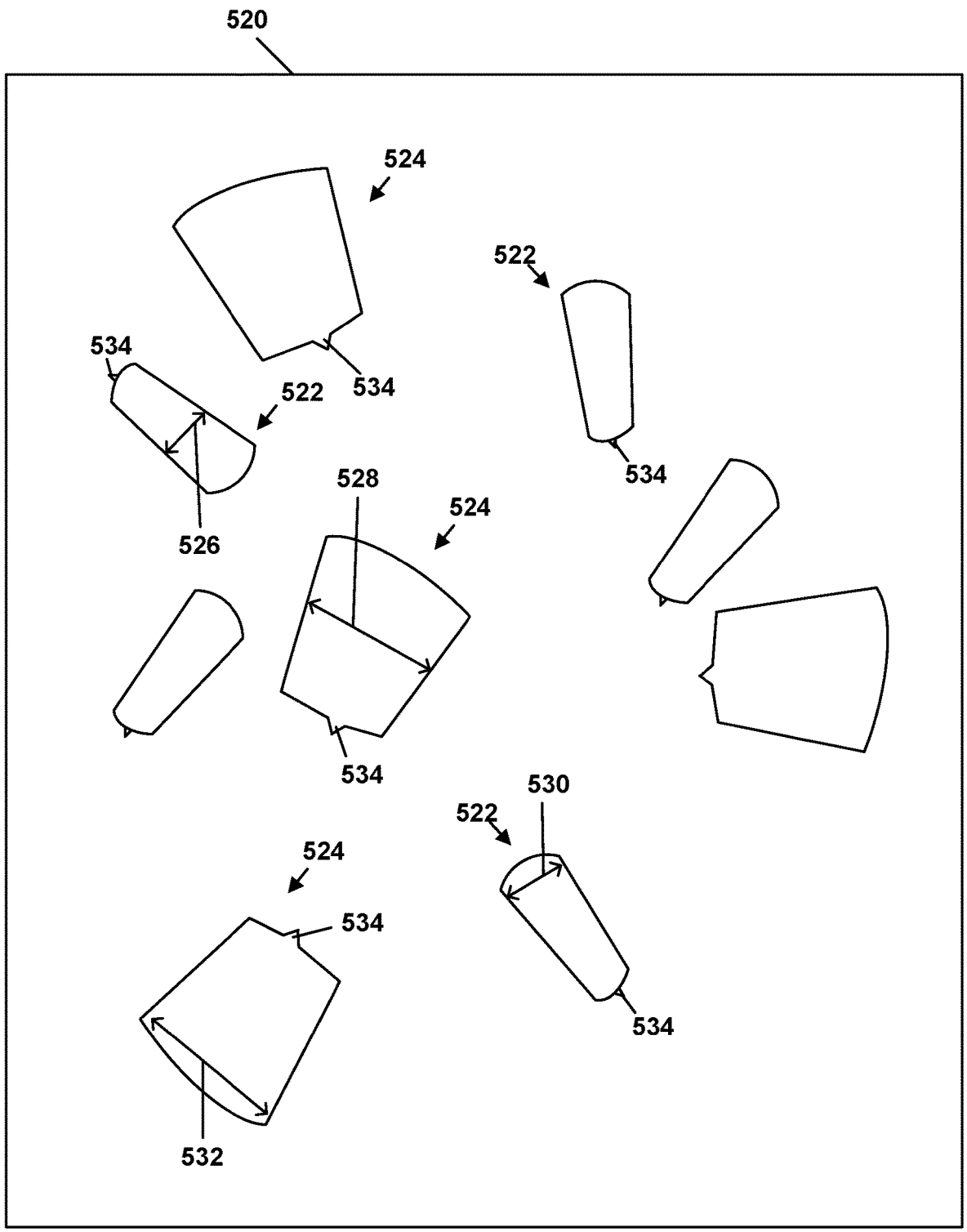
FIG. 7 illustrates an example image of kernels derived from image data, in accordance with some embodiments of the present disclosure.

The orientation can be determined at step 510 by estimating, by the computing device, one or more dimensions of the kernel. The one or more dimensions can include a pixel count, an area, a length, a height, and a width of the kernel. For example, a width of the kernel can be determined at a middle section of the kernel away from the root of the kernel (e.g., see widths 526 and 528 as shown in FIG. 7). Also, the width can be determined at an outer end of the kernel opposite of the root of the kernel (e.g., see widths 530 and 532 shown in FIG. 7 as well as roots 534). In such an example, the root of the kernel can be identified by the computing device (e.g., see roots 534 shown in FIG. 7). Also, in such an example, the wide side orientation 524 can be determined when a width of a kernel exceeds a first threshold width. The narrow side orientation 522 can be determined when a width of a kernel is less than a minimum threshold width or below the first threshold. In FIG. 7, the widths 526 and 530 are below the minimum threshold width or the first threshold width; thus, it can be determined that associated kernels have a narrow side orientation 522. And, as shown in FIG. 7, the widths 528 and 532 are above the first threshold width; thus, it can be determined that associated kernels have a wide side orientation 524.

The computing device can be part of a sensor—such as the sensor that captures the image of the plurality of kernels (e.g., see sensor 420). In some embodiments, dimensions (such as pixel count, width, height, and area) can be determined by a part of the computing device that is in a sensor. Also, the central core size can be determined by a part of the computing device that is remote of the sensor. The determinations of the dimensions and the central core size can be determined by parts of the computing device in a sensor.

In some embodiments, the kernels are corn kernels. In such embodiments, the estimated respective dimensions of the kernels of steps 510 and 512 are estimated dimensions of corn kernels. And, the respective central core sizes determined at step 514 are cob sizes and the table used in step 514 is a table having correlations between corn kernel dimensions and cob sizes.

At step 512, the method includes determining, by the computing device, one or more dimensions of the kernel of the plurality of kernels based on the image data and image processing. For example, the method continues with determining a width of the kernel based on the image data and image processing, at step 512. The dimension(s) used to determine the orientation can also be used as the outputted dimension(s) of step 512 or as a basis for determining the outputted dimension(s) of step 512. For example, the width of a kernel can be the outputted dimension of step 512. Or, the dimension(s) or width of a kernel outputted at step 512 can be derived from the determined orientation information and/or the initially determined dimension(s). The dimension(s) of the kernel outputted at step 512 can also be derived from a lookup table. Further, the outputted dimension(s) of step 512 can also be determined by counting the number of pixels that are within identified edges of the kernel. Also, the edges can be identified by edge detection. For example, after a width 530 and narrow side orientation 522 are determined for a kernel at step 510, the width 530 can be selected at step 512 as the determined output of step 512 and be used as an input for step 514. Or, for example, the number of pixels in the part of the image representing the kernel can be counted to determine a width or an area of the kernel at step 512 and then the dimension outputted at step 512 can be used as input for step 514. In another embodiment, for example, after a width 530 and narrow side orientation 522 are determined for a kernel at step 510, an area of the kernel can be determined at step 512 according to the determined width, a second determined width or another dimension of the kernel. Or, for example, the number of pixels in the part of the image representing the kernel can be counted to determine an area of the kernel. The area can then be used as input for step 514. As can be imagined, there are many ways to determine the orientation at step 510 and to determine the dimension(s) at step 512.

For the aforementioned image processing, an edge detection algorithm and a geometry algorithm can be used to determine the orientation and the one or more dimensions of the kernel in which the dimension(s) can include a pixel count, an area, a width, and/or a height of the kernel, for example. There can also be preprocessing that enhances the image processing. The determining of orientation and at least one dimension of a kernel of the plurality of kernels can include detecting a plurality of edges of the kernel and determining an orientation for the kernel based on the plurality of edges as well as determining at least one dimension of the kernel such as width.

The result of the edge detection can include a set of connected curves that indicate the boundaries a kernel as well as curves that correspond to discontinuities in surface orientation. Applying the edge detection to image of the kernels can significantly reduce the amount of data to be processed in the image data and can filter out information that may be regarded as less relevant, while preserving the important structural properties of the image of the kernels. The edge detection can include search-based or zero-crossing based methods. The search-based methods detect edges by first computing a first-order derivative expression, such as the gradient magnitude, and then searching for local directional maxima of the gradient magnitude using an estimate of the local orientation of the edge, such as the gradient direction. The zero-crossing based methods search for zero crossings in a second-order derivative expression determined from the image. The zero-crossings can include the zero-crossings of the Laplacian or the zero-crossings of a non-linear differential expression. As a pre-processing step to edge detection, a smoothing stage, typically Gaussian smoothing, can be applied. This can assist with noise reduction.

In the determinations of kernel dimensions and characteristics described herein, digital image processing can be used via general processor or a DSP. The digital image processing can include use of a computer or integrated circuit to process digital images through one or more algorithms. The determinations can also be made using digital signal processing techniques from signals captured by the sensor. Such techniques can include image signal processing which is a sub-category of digital signal processing. The signal or image processing that occurs during the determinations or in a signal or image pre-processing stage can include algorithms to be applied to the input data to avoid the build-up of noise and distortion during processing.

In some embodiments, the digital image processing can include or be based on is a concrete object or event classification, feature extraction, multi-scale signal analysis, pattern recognition, and projection. Also, the digital image processing can include or use anisotropic diffusion, hidden Markov models, image editing, image restoration, independent component analysis, linear filtering, an artificial neural network (ANN), partial differential equations, pixilation, point feature matching, principal components analysis, self-organizing maps, or wavelets.

At step 514 of the method 500, the method includes determining, by the computing device, minimum and maximum respective central core sizes correlated with the kernel based on the determined dimension(s) of step 512 and a table having correlations between kernel dimensions and central core sizes. A minimum respective central core size can be based on a predetermined minimum amount of rows of kernels in the central core of a crop (such as a predetermined twelve rows which is a common minimum of rows of corn kernels in a cob of corn). A maximum respective central core size can be based on a predetermined maximum amount of rows of kernels in the central core of a crop (such as a predetermined eighteen rows which is a common maximum of rows of corn kernels in a cob of corn). Multiples of maximum and minimum core sizes are a part of the table and each size in the multiples of maximum and minimum core sizes are associated with one or more kernel dimensions in the table.

The core sizes can include minimum and maximum circumferences, radiuses, or diameters of a central core of a crop. And, for example, number of rows multiplied by a dimension of a kernel, such as a width of the kernel, can result in an estimated circumference of the corresponding central core and thus a diameter or radius of the central core can be determined accordingly. And, one or more of such results can be used as one or more inputs for determining boundary conditions for the operating clearance between the concave assembly and the crop processing rotor. In some embodiments, the min and max number of rows of the central core are each a static value. And, generally, a range is used for the boundary conditions because a number of rows in a central core of a crop is typically unknown. Thus, for example, a range of diameters, circumferences, or radiuses of a central core results from the determination at step 514 and can be used as input for the determination of the boundary conditions at step 516.

In some embodiments, the boundary conditions include a range of shortest distances between the concave assembly and the crop processing rotor. For example, the range can include a maximum and minimum shortest distance between the concave assembly and the crop processing rotor. The maximum and minimum shortest distances can be derived from the determined minimum central core size and the determined maximum central core size, respectively. For example, the maximum and minimum shortest distances can be equal to or correlate to a determined maximum central core diameter and a determined minimum central core diameter.

At step 516, the method 500 includes determining boundary conditions for an operating clearance between a concave assembly (e.g., see concave assembly 324) and a crop processing rotor (e.g., see rotor 322) based on the minimum and maximum central core sizes. And, at step 518, the method 500 continues with the computing device at least partially controlling operating clearance between a concave assembly and a crop processing rotor of the combine harvester based the determined boundary conditions and hence the corresponding range of central core sizes.

As shown in FIG. 8, method 600 starts with step 502 and continues with steps 504, 506, 508, 510, 512, and 514. After step 514 in which the minimum and maximum central core sizes are determined, the method 600 at step 602 includes receiving, by the computing device, sensed additional conditions related to an output of the combine harvester. For example, step 602 can include receiving a sensed debris-to-kernel ratio of the harvester. At step 604, the method 600 continues with adjusting the boundary conditions for the operating clearance between a concave assembly (e.g., see concave assembly 324) and a crop processing rotor (e.g., see rotor 322) based on the sensed additional conditions. At step 606, the method 600 continues with controlling the operating clearance based on the adjusted boundary conditions.

As shown in FIG. 9, method 700 starts with step 502 and continues with steps 504, 506, 508, 510, 512, and 514. After step 514 in which the minimum and maximum central core sizes are determined, the method 700 at step 702 includes communicating, by the computing device, the determined boundary conditions for the operating clearance over a network to a user interface device, e.g., see user interface 220 and communication network 104. The communication of the boundary conditions to the user interface device can occur during or after processing of the crop by the combine harvester. Not shown, the method can also include displaying the boundary conditions by a display of the user interface device. At step 704, the method 700 continues with the UI device interacting with a user and then communicating adjusted boundary conditions for the operating clearance over the network to the computing device. The boundary conditions can be adjusted at least partially and manually by a user of the UI using voice and/or graphical user interface controls. At step 706, the method 700 continues with receiving, by the computing device, the adjustments to the boundary conditions from the user interface device. And, at step 708, the method 700 continues with the computing device controlling, at least partially, an operating clearance between a concave assembly (e.g., see concave assembly 324) and a crop processing rotor (e.g., see rotor 322) based on the adjusted boundary conditions.

The maximum and minimum central core sizes outputted by the computing device in the aforesaid methods and other foreseeable embodiments can be averaged. And, the outputted averages can be used as input for determining the boundary conditions of the operating clearance between the concave assembly and the crop processing rotor (e.g., averages of maximum and minimum central core sizes can be used as input at step 516). The averages can represent average central core sizes for a bin of kernels (such as a bin of kernels in an active harvester at any point of time or a harvester with a full bin just before delivery of the kernels by the harvester). The averages can also represent average central core sizes of respective bins of a plurality of harvesters or average central core sizes of bins in general. The central core sizes outputted can be average central core sizes for each section of a field and an average central core size for the entire field.

In some embodiments, the aforementioned methods can be performed by an example system (such as the computing system 102). Such a system includes an input device configured to receive image data associated with kernels harvested by a combine harvester (such as one of combine harvesters 106, 108, and 110). The system also includes a data processor connected to the input device and configured to estimate respective dimensions of the kernels based on the image data as well as determine respective central core sizes based on the estimated respective dimensions of the kernels and a table including correlations between kernel dimensions and central core sizes. And the data processor is configured to control operating clearance between a concave assembly and a crop processing rotor of the combine harvester based the determined respective central core sizes. In some embodiments, the kernels are corn kernels, the estimated respective dimensions of the kernels are estimated dimensions of corn kernels, the respective central core sizes are cob sizes, and the table is a table including correlations between corn kernel dimensions and cob sizes.

In some embodiments, the data processor is configured to determine a minimum central core size and a maximum central core size based on the determined respective central core sizes as well as determine boundary conditions for the operating clearance based on the minimum central core size and the maximum central core size. And, the data processor is configured to control the operating clearance based on the determined boundary conditions.

In some embodiments, the data processor is configured to receive sensed additional conditions related to an output of the combine harvester, adjust the boundary conditions for the operating clearance based on the sensed additional conditions, and control the operating clearance based the adjusted boundary conditions. In some embodiments, the sensed additional conditions include a debris-to-kernel ratio.

In some embodiments, the data processor is configured to communicate the determined boundary conditions over a network to a user interface device as well as receive adjustments to the boundary conditions from the user interface device. E.g., see communication network 104 and user interface 220. And, the data processor is configured to control the operating clearance based on the received adjustments to the boundary conditions. In some embodiments, the communication of the determined boundary conditions to the user interface device occurs during or after processing of the kernels by the combine harvester. In some embodiments, the system includes a display of the user interface device and it is configured to display the determined boundary conditions and display graphical user interface elements that are configured to be manipulated by an operator to control adjustments to the boundary conditions.

In some embodiments, the system includes a sensor (such as sensor 420) configured to capture respective images of the kernels, generate the image data associated with the kernels based on the respective images of the kernels, and communicate the image data to the data processor.

In some embodiments, the system is included entirely in an apparatus.

Alternatively, such a system includes an apparatus that includes a sensor (such as the sensor 420) and a computing device (such as computing system 400). The sensor is configured to capture respective images of kernels harvested by a combine harvester and generate image data associated with the kernels based on the captured respective images. The computing device is configured to receive the image data, estimate respective dimensions of the kernels based on the image data, and determine respective central core sizes based on the estimated respective dimensions of the kernels and a table including correlations between kernel dimensions and central core sizes.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. A method, comprising:
  receiving, by a computing device, image data associated with corn kernels harvested by a combine harvester;
  estimating, by the computing device, respective dimensions of the corn kernels based on the image data;
  determining, by the computing device, respective central core sizes based on the estimated respective dimensions of the kernels and a table comprising correlations between kernel dimensions and central core sizes, the central core sizes being diameters or radiuses of corn cobs;

controlling, by the computing device, operating clearance between a concave assembly and a crop processing rotor of the combine harvester based on the determined respective central core sizes.

2. The method of claim 1, comprising:

capturing, by a sensor, respective images of the kernels;

generating, by the sensor, the image data associated with the kernels based on the respective images of the kernels; and communicating, by the sensor, the image data to the computing device.

3. The method of claim 1, comprising:

determining, by the computing device, a minimum central core size and a maximum central core size based on the estimated respective dimensions of the kernels and the table comprising correlations between kernel dimensions and central core sizes;

determining, by the computing device, boundary conditions for the operating clearance based on the minimum central core size and the maximum central core size; and controlling, by the computing device, the operating clearance based on the determined boundary conditions.

4. The method of claim 3, comprising:

receiving, by the computing device, sensed additional conditions related to an output of the combine harvester;

adjusting, by the computing device, the boundary conditions for the operating clearance based on the sensed additional conditions; and controlling, by the computing device, the operating clearance based on the adjusted boundary conditions.

5. The method of claim 4, wherein the sensed additional conditions comprise a debris-to-kernel ratio.

6. The method of claim 3, comprising:

communicating, by the computing device, the determined boundary conditions over a network to a user interface device;

receiving, by the computing device, adjustments to the boundary conditions from the user interface device; and controlling, by the computing device, the operating clearance based on the received adjustments to the boundary conditions.

7. The method of claim 6, wherein the communication of the determined boundary conditions to the user interface device occurs during or after processing of the kernels by the combine harvester.

8. The method of claim 6, comprising displaying the determined boundary conditions by a display of the user interface device.

9. The method of claim 8, comprising displaying graphical user interface elements by the display, wherein the graphical user interface elements are configured to be manipulated by an operator to control adjustments to the boundary conditions.

10. A system, comprising:

an input device configured to receive image data associated with corn kernels harvested by a combine harvester; and a data processor connected to the input device and configured to:

estimate respective dimensions of the corn kernels based on the image data;

determine respective central core sizes based on the estimated respective dimensions of the kernels and a table comprising correlations between kernel dimensions and central core sizes, the central core sizes being diameters or radiuses of corn cobs;

control operating clearance between a concave assembly and a crop processing rotor of the combine harvester based on the determined respective central core sizes.

11. The system of claim 10, comprising a sensor configured to:

capture respective images of the kernels;

generate the image data associated with the kernels based on the respective images of the kernels; and communicate the image data to the data processor.

12. The system of claim 10, wherein the data processor is configured to;

determine a minimum central core size and a maximum central core size based on the determined respective central core sizes;

determine boundary conditions for the operating clearance based on the minimum central core size and the maximum central core size; and control the operating clearance based on the determined boundary conditions.

13. The system of claim 12, wherein the data processor is configured to:

receive sensed additional conditions related to an output of the combine harvester;

adjust the boundary conditions for the operating clearance based on the sensed additional conditions; and control the operating clearance based on the adjusted boundary conditions.

14. The system of claim 13, wherein the sensed additional conditions comprise a debris-to-kernel ratio.

15. The system of claim 12, wherein the data processor is configured to:

communicate the determined boundary conditions over a network to a user interface device;

receive adjustments to the boundary conditions from the user interface device; and control the operating clearance based on the received adjustments to the boundary conditions.

16. The system of claim 15, wherein the communication of the determined boundary conditions to the user interface device occurs during or after processing of the kernels by the combine harvester.

17. The system of claim 15, comprising:

a display of the user interface device, configured to:

display the determined boundary conditions; and display graphical user interface elements, wherein the graphical user interface elements are configured to be manipulated by an operator to control adjustments to the boundary conditions.

18. An apparatus, comprising:

a sensor, configured to:

capture respective images of corn kernels harvested by a combine harvester; and generate image data associated with the corn kernels based on the captured respective images; and a computing device, configured to:

receive the image data;

estimate respective dimensions of the corn kernels based on the image data; and determine respective central core sizes based on the estimated respective dimensions of the corn kernels and a table comprising correlations between corn kernel dimensions and central core sizes, the central core sizes being diameters or radiuses of corn cobs.

* * * * *